United States Patent [19]

Mosky

[11] 4,048,278

[45] Sept. 13, 1977

[54] METHOD FOR MANUFACTURING DIMENSIONALLY-STABLE SHAPED ARTICLES

[75] Inventor: George D. Mosky, Lancaster, Canada

[73] Assignee: Intalite International N.V., Netherlands Antilles

[21] Appl. No.: 678,457

[22] Filed: Apr. 19, 1976

Related U.S. Application Data

[63] Continuation-in-part of Ser. No. 470,648, May 16, 1974, abandoned.

[30] Foreign Application Priority Data

May 17, 1973 Canada .................................. 171705
Oct. 30, 1973 Japan ................................ 48-121283

[51] Int. Cl.$^2$ ............................................. B29D 3/02
[52] U.S. Cl. .................................. 264/135; 264/134; 264/136; 264/234; 264/324; 428/443

[58] Field of Search ............... 264/134, 136, 234, 286, 264/322, 324, 265, 308, 135; 428/443

[56] References Cited

U.S. PATENT DOCUMENTS

| | | | |
|---|---|---|---|
| 422,760 | 3/1890 | Frist | 264/324 X |
| 836,123 | 11/1906 | Lundgren | 264/324 X |
| 1,962,577 | 4/1932 | Wolochow | 264/234 |
| 3,535,150 | 10/1970 | Lipsett | 428/443 X |
| 3,682,747 | 8/1972 | Munthers | 264/90 X |

Primary Examiner—Richard R. Kucia
Attorney, Agent, or Firm—Berman, Aisenberg & Platt

[57] ABSTRACT

A method for making a dimensionally-stable shaped article (comprising at least one one layer of asbestos paper treated with a mineral acid selected from sulfuric acid, hydrochloric acid and phosphoric acid), including placing the treated asbestos paper sheet on a mould in a substantially pressureless manner and then allowing it to dry at normal room temperature.

5 Claims, No Drawings

METHOD FOR MANUFACTURING DIMENSIONALLY-STABLE SHAPED ARTICLES

RELATED APPLICATION

This application is a continuation-in-part of copending, but now abandoned, application Ser. No. 470,648, filed May 16, 1974.

BACKGROUND OF THE INVENTION

The present invention relates to a method for manufacturing a dimensionally-stable shaped article for use as ceiling coffers.

Ceiling tiles presently in use are generally made of pressed paper pulp or porous glass fiber and may be covered with various coatings to improve fire-resistance and for decorative purposes. Polystyrene foam or polyurethane foam is also used to produce what are commonly known as "luminous ceilings". Panels for such luminous ceilings are commonly sold in standard sizes of 3 feet × 3 feet. These luminous ceiling panels may be formed in a wide variety of configurations, e.g. dish-shaped or bowl-shaped, and of considerable depth, providing intersecting visual effects in combination with lighting fixtures.

Dimensionally-stable shaped shrink-proof articles may be moulded to produce almost any contour imaginable, replacing concrete, asbestos cement, moulded plastics, conventional wall paneling, plaster and the like. The articles are lightweight, strong, resistant to fire and acid, and do not give off toxic gases and are economical to produce because neither considerable pressure nor heat is required in the manufacture.

For example, in U.S. Pat. No. 1,962,577, which issued on June 12, 1934, in the name of David Wolochow, a method of producing molded compositions from asbestos is disclosed wherein chrysotile asbestos fibres, in the form of short fibres, sand or dust, is mixed with a mineral acid, for example, phosphoric acid; the mixture is applied to a mold and subsequently dried at a temperature exceeding 100° C.

It is indicated that if the drying is effected at room temperature, the molded product will have some strength after a considerable length of time, but the shrinkage is too great to give a satisfactory product. Thus, the disclosed process requires drying at elevated temperatures. Moreover, the use of asbestos fibres for molding large complex shapes is not practicable or economical. That is, the application of high pressure would be required to ensure adequate shape retention. The use of fibres also makes it very difficult to maintain a uniform wall thickness in the molded article.

SUMMARY OF THE INVENTION

On the other hand, according to the method of the present invention a dimensionally-stable shaped shrink-proof article is obtained without the necessity of heat-drying. By using asbestos paper sheet as a starting material, the molding of large complex shapes is achieved without the need for the application of considerable pressure.

These advantages are achieved by the method according to the present invention for the manufacture of a dimensionally-stable shaped shrink-proof article comprising the steps of, soaking asbestos paper sheet in a bath containing a mineral acid, laying at least one layer of the soaked paper sheet on the mold, and smoothing the soaked sheet against the surface of the mold by hand pressure only, and drying at normal room temperature.

Articles manufactured according to the method of the present invention were found to be fire and acid-resistant, were dimensionally stable in that they do no change by shrinkage or expansion and exhibited good heat and sound insulation and were non-toxic following subjection to the following tests:
1. Cross hatch adhesive
2. 24 hours boiling water
3. 25 hours direct steam impingement
4. 7 cycles freeze-thaw 0° F to 70° F
   a. dry and
   b. in water
5. 168 hours humidity exposure 140° F 100% humidity
6. 20 days water soak
7. Incombustibility ASTME-84 Flame spread factor 0, fuel contributed 7, Smoke Density 9.
8. Toxicity — no ignition, and gaseous composition is comparable to normal air.

A V-shaped article 12 inches long, wherein the legs of the V were 6 inches long, was tested for strength following treatment with solutions of phosphoric acid of concentrations ranging from 10-100% by weight, in 5% increments.

It was found that the optimum bath for treating the asbestos paper sheet is 40% by weight water and 60% by weight of 85% technical grade phosphoric acid. The same procedure was used for hydrochloric acid and sulphuric acid with similar results.

The concentration of the phosphoric acid may vary from 10% to 100% by weight. Other mineral acids may also be used, for example, sulfuric acid or hydrochloric acid.

The molded articles may be made as strong as required by the molding of as many layers of asbestos paper sheet as is necessary to obtain the desired strength.

To improve weather resistance, strength and for improved appearance, the shaped articles may be coated on one or both sides with a cement based paint or other commercial finish, which may be conveniently sprayed onto the shaped articles.

The present invention is regarded as a substantially pressureless method or one wherein the application of considerable pressure is unnecessary. The only pressure that is required is that which is necessary to conform acid-soaked asbestos-paper sheet to contours of a mold, excluding occluded air from between such sheet and the mold surface. Once the thus-soaked asbestos-paper sheet is appropriately laid on the mold surface, no pressure other than gravity is required to maintain the sheet in position or in shape during the remaining molding or drying.

Drying is effected at room temperature; it can, but need not necessarily, be hastened by dehumidification of the room in which molding is effected. Such dehumidification is accomplished by any conventional means. Even without any dehumidification, i.e. with normal air flow, evaporation takes place and a cured molded article results.

The article weighs between 1 and 1½ pounds per square foot surface area, depending upon the amount of reinforcing layers of asbestos paper sheet and the type of cement coating and aggregate used. This is considered as lightweight in comparison to alternative methods of making such articles from pre-cast concrete and plaster.

The article is considered shrink-proof within acceptable commercial building tolerances in that the article maintains dimensions of the surface of the mold to a maximum variation of ⅛ in an article with overall dimensions of up to 5 feet.

The following specific examples are included to further describe the nature of the present invention.

EXAMPLE 1

Asbestos paper sheet manufactured by Johns Manville (for example ⅛ inch thick paper) is dipped into a bath and saturated. The bath contains 60% by weight phosphoric acid (85% technical grade) and 40% by weight water. The soaked asbestos paper sheet is then layed on the mold and smoothed against the surface of the mold by hand pressure, (extra layers of soaked asbestos paper sheet can be applied to reinforce and strengthen corners). Drying is subsequently effected at normal room temperature of 72° F. The resulting product is weather-, acid-, and fire-resistant, and dimensionally stable and shrink proof in that the product maintained all dimensions of the surface of the mold to a maximum variation of ⅛ inch over 4 feet, after 24 hours of drying.

EXAMPLE 2

A 5 feet-0 inch × 5 feet-0 inch × 18 inch deep ceiling coffer was formed in the above manner. It was dimensionally stable and shrink proof, very strong and structurally adequate. To further improve weather-resistance and strength and for appearance purposes the coffer was then primed both sides using a cement mortar modifier and water (50% water and 50% modifier). For decorative purposes, a cement coating was formulated and sprayed on. The composition of the coating used is as follows:

| | Per Cent by Weight |
|---|---|
| Cement mortar modifier | 16.0 |
| Non-ionic surfactant | .25 |
| Pigment | 3.5 |
| Silica | 56.5 |
| White Portland Cement | 18.5 |
| Water | 5.25 |

The resulting piece was attractive, strong, incombustible and resembled precast concrete.

EXAMPLE 3

A 4 feet × 4 feet × 8 inch deep ceiling coffer was produced as above except a minor amount of an aggregate was added to the coating to give a textured appearance. This particular shape was able to support 400 lb. without breaking.

What I claim as my invention is:

1. A method for the manufacture of a dimensionally-stable shaped article for use as a ceiling coffer, comprising the steps of soaking asbestos paper sheets in a bath containing a mineral acid selected from the group consisting of sulfuric acid, hydrochloric acid and phosphoric acid, applying in a substantially pressureless manner at least one sheet of the soaked asbestos paper sheet as a layer to a mold and drying at normal room temperature, whereby to form a shrink-proof article without application of heat.

2. A method according to claim 1 wherein the bath comprises phosphoric acid in a concentration of 10 to 100% by weight.

3. A method according to claim 2 wherein the bath comprises 60% by weight of 85% technical grade phosphoric acid and 40% by weight of water.

4. A method according to claim 3 wherein the asbestos sheet is of a thickness of about ⅛ inches.

5. A method according to claim 1, including the additional step of applying a cement composition to the shaped article, said cement composition comprising 16.0% by weight cement mortar modifier, 0.25% by weight of non-ionic surfactant, 3.5% by weight of pigment, 56.5% by weight of silica, 18.5% by weight white Portland cement, 5.25% by weight of water and a minor amount of an aggregate.

* * * * *